United States Patent [19]
Doushita et al.

[11] Patent Number: 5,479,311
[45] Date of Patent: Dec. 26, 1995

[54] MAGNETIC TAPE CASSETTE HAVING IMPROVED MAGNETIC TAPE SUBSTRATE AND TAPE GUIDE FOR REDUCING ELECTROSTATIC CHARGING

[75] Inventors: Hiroaki Doushita; Yasutoshi Okuzawa; Tadashi Ishiguro; Takeshi Kakuta; Kazuo Kato, all of Kanagawa, Japan

[73] Assignee: Fuji Photo Film Co., Ltd., Kanagawa, Japan

[21] Appl. No.: 223,106

[22] Filed: Apr. 4, 1994

[30] Foreign Application Priority Data

Apr. 2, 1993 [JP] Japan .................. 5-022152 U
Apr. 9, 1993 [JP] Japan .................. 5-106016

[51] Int. Cl.$^6$ .......................... G11B 23/04; G11B 15/60
[52] U.S. Cl. ......................... 360/132; 360/130.21
[58] Field of Search ..................... 360/132, 130.2, 360/130.21; 226/196

[56] References Cited

U.S. PATENT DOCUMENTS 4,364,988 12/1982 Andoh et al. ..................... 428/212
4,491,891 1/1985 Shiba ............................. 360/130.21
5,026,598 6/1991 Koyama et al. ................... 428/323
5,098,785 3/1992 Yanagita et al. .................. 428/322

FOREIGN PATENT DOCUMENTS 0123007 9/1979 Japan ............................ 360/130.21
61-192091 8/1986 Japan .

*Primary Examiner*—John H. Wolff
*Assistant Examiner*—William R. Korzuch
*Attorney, Agent, or Firm*—Sughrue, Mion, Zinn, Macpeak & Seas

[57] ABSTRACT

A magnetic tape cassette whose reliability is considerably improved by preventing triboelectrification by tape-and-guide friction. A metal tape guide for guiding the magnetic tape while in contact with the back surface of the tape. The substrate of the magnetic tape is made of polyethylene terephthalate or polyethylene naphthalate, and has a surface specific resistance $R_s$ of $10_8$ $\Omega/cm^2$ or more. The tape guide is made of stainless steel or aluminum, and the surface roughness of the tape guide is such that the root mean square roughness value $R_{rms}$, as determined by height from a reference surface, is 60 nm or lower. Also, the back surface of the tape may be provided with 30 to 400 protrusions of a height of 300 nm per 0.1 mm$^2$.

7 Claims, 3 Drawing Sheets

MAGNETIC TAPE CASSETTE HAVING IMPROVED MAGNETIC TAPE SUBSTRATE AND TAPE GUIDE FOR REDUCING ELECTROSTATIC CHARGING

BACKGROUND OF THE INVENTION

The present invention relates to a magnetic tape cassette, and more particularly to a magnetic tape cassette, used for a VTR, for example, with metal tape guides for guiding a magnetic tape while in contact with the magnetic surface of the magnetic tape.

Magnetic recording media have widely been used for recording tape cassettes, video tape cassettes, computer tape cassettes, disc cartridges, and the like. The recording density of a magnetic recording medium such as a magnetic tape has been increased year by year. With this increase in recording density, the wavelength of the recorded signal is proportionately reduced. Also, digital recording methods are starting to supplant the analog recording methods currently widely employed. In order to increase the recording density, a thin metallic film is sometimes used for the magnetic layer.

There have been many proposals to improve the electromagnetic characteristics of a coated magnetic tape in which one side of a substrate (nonmagnetic support) is coated with magnetic material. Some of these proposals relate to improving the magnetic properties of a ferromagnetic powder used in the magnetic material, while others relate to techniques for smoothing the surface of the magnetic layer. However, those proposals are still insufficient in satisfying the required high density of recording.

As the wavelength of the recorded signal is shortened due to the increased recording density, self-demagnetization sometimes occurs in the recording mode whereby the output level is reduced as the magnetic layer becomes thicker. For this reason, efforts have been made to reduce the thickness of the magnetic layer. However, when the magnetic layer is thinned, the surface of the magnetic layer can be more easily influenced by the surface roughness of the substrate. This results in deterioration of the electromagnetic characteristics of the tape.

To avoid this, production of magnetic tape with an extremely smooth surface is desired. A general means to realize this is to smooth the surface of the substrate. The smoothed substrate surface improves the electromagnetic characteristics of the magnetic layer formed on the substrate, but causes poor running of the magnetic tape constructed using such a substrate. To solve this problem, a back layer can be provided on the surface of the substrate opposite the surface thereof having the magnetic layer. For the details of a technique using a back layer, reference is made to Examined Japanese Patent Application No. Sho. 50-3927, and Published Unexamined Japanese Patent Application Nos. Sho. 57-111828, 52-102204, and 52-96505.

On the other hand, numerous problems arise from the provision of the back layer on the substrate surface. Any unevenness of the back layer surface physically influences the magnetic layer, impairing the electromagnetic characteristics of the magnetic layer. Moreover, as additional processes must be used in manufacturing the tape, the manufacturing defect rate increases, resulting in lowered productivity.

In order to reduce costs, mechanical parts used in common magnetic tape cassettes, such as magnetic tape cassettes of the β type or the VHS type, are often manufactured with less precision. This creates problems in that the magnetic tape is more frequently subject to scratching, resulting in increased rates of dropout and poor tape running.

The fact that improving the surface property of the substrate improves the electromagnetic characteristics of the magnetic tape is well known. However, excessive improvement of the surface property impairs the tape running performance and durability. Also, the fact that increasing the coefficient of friction between the substrate surface of a magnetic tape 17 and tape guides 13 disposed in the cassette half as shown in FIG. 6 hinders the tape running is generally known.

In the cassette 10 shown in FIG. 6 where the magnetic tape 17 runs between a supply reel 11 and a take-up reel 12, a guide structure for guiding the tape to the forward side of the cassette, which structure includes cylindrical tape guides 13, a guide pole 14, a guide roller 15, and a pressure pad 16, is provided. The slide property of the guide structure and the magnetic tape, the mechanical frictional resistance therebetween, and the like determine the running performance of the magnetic tape 17. An additional factor affecting the tape running performance is triboelectrification (static electric charging) caused by the friction between the tape guides 13 and the magnetic tape 17. Particularly in the initial stage of tape running, an increase of triboelectrification causes the tape guide to generate an attraction force. The attraction force makes the tape running unstable. In an extreme case, the tape may be stopped altogether. At high potentials of static electricity, the attraction force creates a large friction between the substrate surface and the tape guides 13. The substrate surface can then more easily be scratched by the guides. When scratched, further larger static electricity is generated, and the attraction force is further increased.

To handle the electrification matter, USP 3,440,091 discloses a technique involving inserting a conductive layer between the magnetic layer and the substrate. A technique in which the surface electrical resistance of the magnetic layer is reduced to better handle the electrification problem is also known. For the latter technique, reference can be made to Published Unexamined Japanese Patent Application No. Sho. 60-70519.

In a magnetic tape having a low surface electric resistance of the magnetic layer and in which the conductive layer is used for the medium layer, if the tape does not include the back layer, the charge potential on the substrate surface increases with increases of the surface electric resistance of the substrate surface, the potential difference between the tape and the tape guides 13 increases, and consequently the tape runs unstably as mentioned above.

In a video tape cassette having tape guide members, such as the tape guides 13, it is desirable to obtain good tape running performance without providing the back layer. This contributes to cost reduction.

Various techniques for producing the tape guides 13 have been proposed, for example, in Published Unexamined Japanese Patent Application Nos. Sho. 61-192091 and 62-192092, and Published Unexamined Japanese Utility Model Application Nos. Sho. 61-136384 and 62-168136.

In Published Unexamined Japanese Utility Model Application No. Sho. 61-136384, an anodic oxidation surface layer is formed on the tape guide member of aluminum. The surface layer is worked by grinding to have fine linear grooves of specific depth (0.2 to 0.6 μm) extending in the tape running direction. The publication describes that the durability of the tape guide is improved, scratching of the tape is reduced, and productivity of the magnetic tape is improved.

In the magnetic tape cassette disclosed in Published Unexamined Japanese Utility Model Application No. Sho. 62-168136, to manufacture the tape guide, a number of grooves are randomly formed in an aluminum surface. The resultant surface is hard chrome plated, and the surface is flattened by grinding.

Thus, the surfaces of the tape guide members disclosed in Published Unexamined Japanese Utility Model Application Nos. Sho. 61-136384 and 62-168136 are covered with an anodic oxidation layer and hard chrome plating layer. Aluminum, which is easy to work and low in cost, is used for the tape guide member. However, an additional step of forming the surface layer must be carried out. Moreover, this technique does nothing to ameliorate the triboelectrification problem and the attendant tape running problem.

Published Unexamined Japanese Patent Application No. Sho. 61-192691 discloses a magnetic tape cassette in which 520 to 700/2 mm$^2$ number of protrusions of 0.0153 μm or lower in height are formed on the surface of a tape guide which is brought into contact with the magnetic tape. The publication defines merely the number required of protrusions of a specific height. The height measurement is generally correlated with the surface roughness.

The conventional reference for the surface roughness measurement is based on the center line of the protrusions. However, the center line moves vertically depending on the size of the downward protrusions. The downward protrusions do not contact the magnetic tape. Nevertheless, these downward protrusions determine the surface roughness (the concept of the upward protrusions). In this respect, the conventional concept of surface roughness cannot provide a true criterion for defining the tape running performance. Data, plotted on graphs, of the relationship of take-up torque and the number of protrusions that are defined referring to the criterion, i.e., the number-of-protrusions vs. dropout relationship, and the relationship between the number of protrusions and substrate scratches, vary greatly. The above publication numerically defines the number of protrusions (upward protrusions) determined referring to this imperfect criterion. It is evident that the resultant product produced using such a technique is inherently unstable. Moreover, the publication teaches nothing related to the tape running characteristics in connection with triboelectrification.

Published Unexamined Japanese Patent Application No. Sho. 61-192092 discloses a magnetic tape cassette in which the radius of the top of a protrusion on the surface of the tape guide where it slidably contacts the magnetic tape is 25 to 100 μm. The publication merely defines the sharpness of the tops of the protrusions. Formation of protrusions each with such a sharp top is impossible though as a practical matter. It is safe to say that the protrusions, even if so formed, cannot provide a tape guide of stable characteristics. This publication also teaches nothing regarding how tape running is affected by triboelectrification.

None of the above clearly describes the causes of attraction due to triboelectrification, but simply treat the electrostatic attraction as a factor involved in the increase of the friction force.

In Published Unexamined Japanese Utility Model Application No. Sho. 61-187089, the guide member is made of synthetic resin containing conductive material, and its surface electric resistance is set to a specific value or smaller. However, studies by the present inventors show that merely reducing the surface electrical resistance fails to provide the desired antistatic effect.

To increase the conductivity of the substrate, some additional measure, for example, mixing conductive filler into the material of the substrate or the magnetic layer, or formation of the back layer as referred to above, is required. As a result, the manufacturing process of the magnetic tapes is made complicated, but the electrostatic attraction problem still is not completely solved.

Soviet Patent SU 128119A discloses a magnetic tape cassette in which, to prevent triboelectrification between the tape guide and the magnetic tape, a grounding pin is connected to the tape guide. This proposal effectively prevents triboelectrification. However, the use of the grounding pin makes the cassette construction complicated. To secure good grounding, means outside the cassette must be used additionally.

SUMMARY OF THE INVENTION

Accordingly, an object of the present invention is to provide a magnetic tape cassette whose reliability is considerably improved by preventing triboelectrification by the tape-and-guide friction, without making the cassette structure complex, without requiring a special process to form a back layer, for example, on the magnetic tape, and without requiring precision manufacturing work.

To achieve the above and other objects, there is provided a magnetic tape cassette with a metal tape guide for guiding a magnetic tape in such a state that it is in contact with the back surface of the magnetic tape opposite to the surface thereof having a magnetic layer, in which the substrate of the magnetic tape is made of polyethylene terephthalate or polyethylene naphthalate, the surface specific resistance $R_S$ of the substrate is equal to or larger than $10^8$ Ω/cm$^2$, the tape guide is made of stainless steel or aluminum, and the surface roughness of the tape guide is such that the root mean square roughness value $R_{rms}$, as determined by height from a reference surface, is 60 nm or lower.

The same object may be further achieved by a magnetic tape cassette with a metal tape guide for guiding a magnetic tape in a such state that it is in contact with the back surface of the magnetic tape opposite to the surface thereof having a magnetic layer, in which 30 to 400 protrusions of a height of 300 nm per 0.1 mm$^2$ are present on the back surface, and the surface roughness of the tape guide is set so that the root mean square roughness value $R_{rms}$, as determined by height from a reference surface, is 60 nm or lower.

DESCRIPTION OF THE PREFERRED EMBODIMENTS

Preferred embodiments of the present invention will be described with reference to the accompanying drawings.

In the magnetic tape cassette according to the present invention, the construction of the cassette half itself is the same as that of the conventional cassette. It is to be noted that the present invention is applicable for substantially any type of cassette half.

Figure 1:
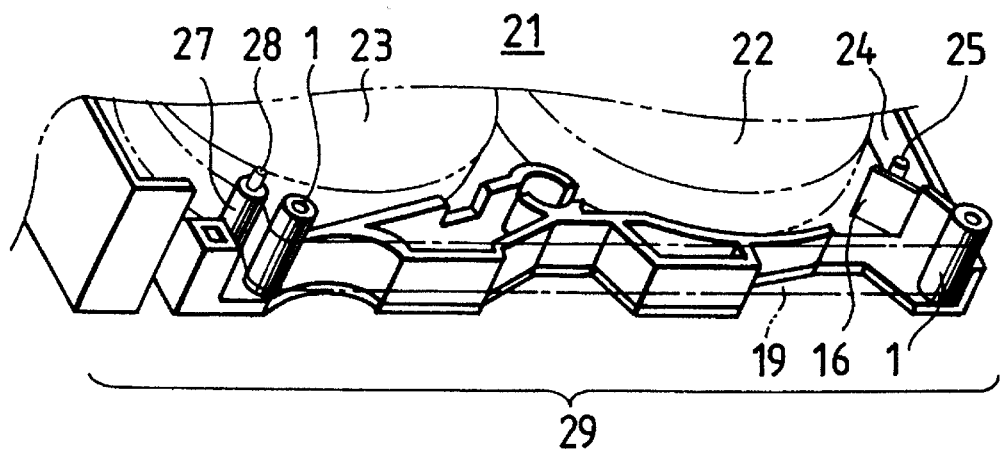
FIG. 1 is a perspective view showing a key portion of a magnetic tape cassette of the VHS type according to an embodiment of the present invention.

The magnetic tape cassette 21 shown in FIG. 1 is composed of a supply reel 22, a take-up reel 23, a solid tape guide 25 standing erect on the lower half 24 (the upper half is omitted), a pair of tape guides 1 having a specific surface property according to the present invention, a guide roller 27, and a magnetic tape 19. In the specification, the tape guides 1 indicate the guide members located in the right and left corners of the cassette case in FIG. 1, which are included in those guide members provided in the cassette half.

The magnetic tape 19 runs from supply reel 22 to the take-up reel 23 by way of the solid tape guide 25, the tape guide 1, an opening 29 of the tape cassette, and the guide roller 27. Along this path, the magnetic surface of the magnetic tape 19 comes into contact with the solid tape guide 25 and the guide roller 27. The guide roller 27 is a roller made of synthetic resin which is rotatably supported by a support shaft 28.

The material of the guide roller 27 and the solid tape guide 25 may be selected from among any of a number of materials, such as metals and plastics. The material and the quality of the guide roller and the solid tape guide are preferably the same as those of the tape-guide.

In the magnetic tape of the present invention, the composition and construction of the magnetic layer on the substrate may be the same as in the conventional case. The magnetic layer is composed of a binder and ferromagnetic powder, and a suitable additive. The constituents of these layers and their proportions may be optionally selected. The magnetic layer may be composed of a single layer or multiple layers. If required, a nonmagnetic layer may be interposed between the magnetic layers. In assembling the tape guides 1 (FIG. 2) into the magnetic tape cassette 21 (FIG. 1), a hollow portion 2 of each of the tape guides 1 is fit to a respective boss of the upper and lower halves. The magnetic tape 19 runs in a state such that the back surface of the tape (the surface of the tape opposite to the surface with the magnetic layer formed thereon) slidably contacts the outer surface 30 of the tape guide 1 at a proper lap angle.

The substrate of the magnetic tape 19 is made of polyethylene terephthalate (PET) or polyethylene naphthalate (PEN). The surface specific resistance $R_s$ of the substrate is at least $10^8$ $\Omega/cm^2$.

To define the surface specific resistance $R_S$, a test piece and three electrodes are used. Of these electrodes, two electrodes, namely, a main electrode and a counter electrode, which are spaced a specific distance g (m), are placed on one side of the test piece, while a further electrode, namely, a guard electrode, is placed on the other side of the test piece. A measurement circuit is formed by inserting a voltage source and a current measuring instrument in a series circuit including the main electrode and the counter electrode. When measured using the measuring circuit, the surface specific resistance $R_s$ is expressed by $$R_s = \rho \cdot g / P$$

where $\rho$: surface resistance ($\Omega$)
P: effective length of the main electrode (m)

In the present invention, as will be apparent from the description to be given later, the potential of the back surface of the substrate when it slidably moves on the tape guide 1 may be controlled to be −40 V or lower by adjusting the surface specific resistance $R_s$ and the surface property of the back surface of the substrate. If required, the construction, composition and the like of the magnetic layer may be appropriately selected for the charge potential adjustment, although it is considered that changing the construction, composition and the like of the magnetic layer contributes less to the charge potential adjustment.

The reasons for obtaining the advantageous effects of the present invention are not yet entirely clear, but may be estimated as described below.

When the back surface of the substrate slidably moves on the tape guide 1, the tape is electrostatically charged by the tape guide. Where the back surface of the substrate is smooth, the area of contact of the tape guide and the back surface is great, so that static electricity is large. Since the back surface of the substrate has a certain number of protrusions, increasing the contact area of the outer surface 30 of the tape guide and the back surface is limited. Microscopically observing the back surface, it can be seen that repetition of point contacts of the outer surface and the substrate surface exist. The presence of these point contacts bring about low static electricity, making the tape hard to charge.

To realize the point-contact state of the back surface of the substrate and the tape guide, there are two possible structural approaches; one relates to treatment of the back surface of the substrate, and the other to the outer surface of the tape guide.

The first approach relating to treatment of the substrate surface in order to obtain the point-contact state of the back surface of the substrate and the tape guide will first be described.

In manufacturing the substrate (nonmagnetic) of the magnetic tape 19, a proper amount of filler particles is added and other conditions are adjusted. In this case, the average particle diameter of the filler particles is 100 to 900 nm, preferably 100 to 600 nm, and more preferably 200 to 500 nm. The result is formation of 30 to 400 protrusions of a height of about 300 nm per 0.1 mm$^2$ on the back surface.

The meaning of the term "average particle diameter" of the filler particles will now be discussed. Using a plasma low-temperature removal process, thermoplastic material is removed in such a manner that the filler particles are not damaged. Filler particles are exposed on the surface of the substrate. The exposed filler particles are observed by a scanning electron microscope (SEM). The obtained image of the filler particles is processed by an image analyzer. The location on the substrate surface being observed is changed to another location. 5000 filler particles in the new location are numerically processed to determine the average particle diameter.

To obtain the desired surface property of the back surface, the content of the filler particles in the substrate should be 1.5 to 40 wt %, preferably 2 to 30 wt %, and more preferably 3 to 20 wt %. If the content of the filler particles is larger than a value within the above ranges, the electromagnetic characteristics of the tape are deteriorated. If smaller than a value within these ranges, the charge potential of the back surface increases.

The number of protrusions on the back surface of the substrate is 30 to 400 per 0.1 mm$^2$, preferably 50 to 300, and more preferably 100 to 250. In this case, the height of the protrusions is 300 nm or higher, preferably 300 to 600 nm, and more preferably 300 to 500 nm. Where the number of protrusions is 400 or larger, the electromagnetic characteristics are deteriorated. Further, when the magnetic tape slidably moves on the tape guide 1, the protrusions act to scratch the magnetic tape. Where the number of protrusions is 30 or smaller, the charge potential on the back surface increases.

The distribution of the filler particles can be adjusted by, for example, an extension operation of the film for manufacturing the substrate.

To measure the height of the protrusions on the back surface, a surface roughness curve on the back surface is produced using a three-dimensional needle-contact surface roughness instrument (type SE-3K, manufactured by Kosaka Laboratories of Japan). The height of those protrusions that are recognized as peaks is measured from an average line of the obtained surface roughness curve. This height is the height of the protrusions. The average line means the center value of the surface roughness curve. The number of protrusions of 300 nm or higher within an area of 0.1 mm$^2$ is counted. In this case, the measuring length is 1 mm. A bypass filter should be used. The peak count value should be 50 nm or more. The measurement is repeated 400 times.

The filler particles may be made of any material except materials that adversely affect the characteristics and performance of the magnetic tape 19 and the devices used in connection with the tape. Specific examples are those materials generally known as fillers. Silica, alumina, titanium oxide and the like are examples of inorganic compounds which can be used for the filler particles. Also, various types of resin particles may be used for the filler particles. Either an organic compound or an inorganic compound, or both, may be used for the filler particles.

Preferable examples of the filler particles are substantially spherical silica particles originating from colloidal silica, crosslinked high polymer (e.g., crosslinked polystyrene), and the like. Particularly, crosslinked high polymer particles of which the degree of crosslinking is increased to 38° C. or higher (temperature rise: 20° C./minute, measured by a thermogravimetric analyzing instrument, Shimazu type TG-30M) at the time of 10 wt % reduction, is preferable because of good production adaptability.

In a case where spherical silica originating from colloidal silica is used, substantially spherical silica containing a small amount of sodium, manufactured by an alcoxide method, exhibits excellent production adaptability.

A preferable example of the filler particles is a mixture of an organic compound and an inorganic compound, for example, crosslinked polystyrene particles:spherical silica:aluminum oxide =1:0.6 to 0.2:0.2 to 0.01 (weight ratio), preferably 1:0.4 to 0.3:0.1 to 0.05 (weight ratio).

By properly controlling the surface property of the back surface of the substrate in the above-mentioned manner, the charge potential of the back surface can be controlled to be −40 V or lower when the tape slidably moves on the tape guide 1.

The above-described method is based mainly on an evaluation of the surface property of the back surface of the magnetic tape 19. The charging property of the back surface is also evaluated in connection with the tape guide 1. Therefore, the state of the outer surface 30 of the tape guide will influence the charge potential of the back surface. In other words, according to the present invention, by selecting the surface properties of the back surface, the properties of the tape guide 1 (the surface property of the guide surface, material, and the like) can be set. For example, the structure of the tape guide 1 and the composition and construction of the back surface of the magnetic tape 19 can be determined by measuring the charge potential and the like of the back surface, for example, with variables of the surface properties of the tape guide 1 and the magnetic tape. This leads to the manufacture of the desired high quality magnetic tape cassettes.

The tension T of the magnetic tape 19 in the magnetic tape cassette 21 is ordinarily within the range of 0.5 to 5.0 g/mm. Also, the tape running speed V of the magnetic tape 19 is generally within the range of 0.014 to 2 m/sec in normal modes of using the magnetic tape cassette, such as normal running, rewinding and fast forwarding. However, the velocity may vary slightly depending on the type of the recording/reproduction apparatus.

The lap angle θ of the magnetic tape 19 and the tape guide 1 is usually between 30° and 120°, although it depends on the type of the tape cassette, whether the tape reel is the right or left reel of the cassette, and the diameter of the wound tape.

The outer diameter d of the tape guide 1, which generally depends on the type of the magnetic tape cassette, may be set to within 2 to 10 mm. The tape guide 1 may be made of a stainless steel material, for example, SUS420J or SUS316, or aluminum material, for example, AC5A according to the JIS (Japanese Industrial Standards).

To manufacture the tape guide 1, which may be made of such a stainless steel such as SUS420J, a cylindrical pole comparable in size with the tape guide 1 is worked by centerless working. By this process, the outer surface is roughly machined to a predetermined geometry. Thereafter, the guide surface is polished by barreling to be finished.

According to the present invention, the charge potential of both the back surface of the magnetic tape and the tape guide 1 can be well controlled to a satisfactorily low value by designing the surface property of the back surface so as to have the protrusion distribution as mentioned above, and the tape guide so as to have a specific surface roughness.

To this end, the protrusion distribution on the back surface is established as described above. The surface roughness of the tape guide 1 is set so that the height of the protrusions is 60 nm or lower at the maximum (the root mean square roughness value $R_{rms}$, as defined by the height of the protrusions from the reference surface for the surface roughness of the outer surface of the tape guide), more preferably 50 nm or lower. Protrusions of 60 nm or higher tend to scratch the back surface. When the protrusions scratch the back surface, the thrust by the protrusions causes extremely high static electricity, so that the quantity of charge is considerably increased, the mutual friction force (attraction force) increases, and abrasions on the back surface are more easily created.

The roughness of the outer surface 30 of the tape guide 1, defined by the protrusions and grooves on the outer surface, is measured using a needle-contact surface roughness instrument, when a surface roughness indication according to the JIS (Japanese Industrial Standards) method is used. In a case where the surface protrusions are a matter of great significance, such as in the case under discussion, protrusion height differences can be observed by a pen oscilloscope for indicating the surface roughness, but these differences do not appear in the calculation data. This implies that in the case of a guide surface finished by polishing, the roughness evaluation is little influenced even if the profile of the protrusions changes, since the surface roughness evaluation by the JIS method takes into account both the protrusions and grooves.

As a result of studies conducted by the present inventors, the fact that reducing the height of the protrusions leads to a reduction of the charge potential of the back surface has been discovered. As a result, the inventors have further carried out studies to fully evaluate the height of the protrusions. As the result of these studies, it has been found that the reference value required to hold down the increase of charge potential can be defined by the protrusion height as detected by an AFM (Atomic Force Microscope) instrument, such as that manufactured by Digital Instruments, Inc., U.S.A.).

When using the AFM instrument, desired information on the surface roughness, for instance, the height $H_m$ of the peak protrusion with respect to the reference surface for the root mean square roughness $R_{rms}$, can be obtained by detecting the roughness on the surface with a micro-contact needle under observation using an Atomic Force Microscope, and the result of the detection is computer processed.

Figure 4:
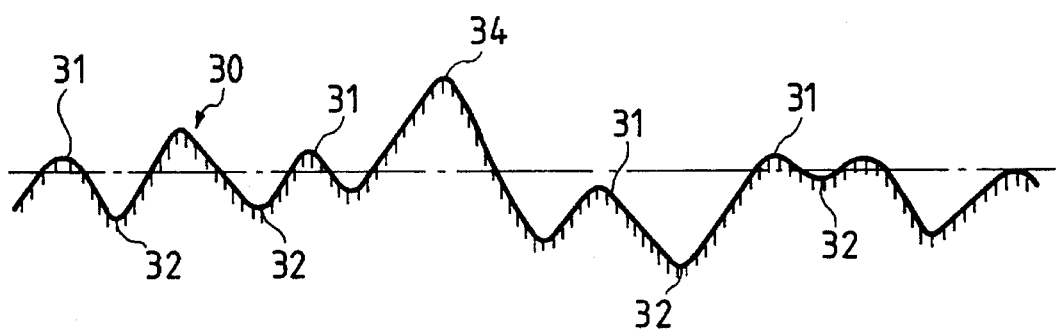
FIG. 4 is a cross sectional view of the outer surface of a tape guide, taken on line B—B in FIG. 2.

The surface roughness of the outer surface 30 of the tape guide 1 is actually measured with an AFM instrument. When the outer surface 30 of the tape guide 1 is microscopically observed, upward protrusions 31 and downward protrusions 32 alternately run on the outer surface 30, as shown in FIG. 4. The reference surface for the surface roughness $R_{rms}$ is obtained through the AFM measurement. Then, an upward protrusion 34, which is the highest of the upward protrusions 31, is obtained in the form of the distance $H_m$ between the top of the upward protrusion 34 and the reference surface.

The tape guide 1 can be made of a wide variety of materials, for example, synthetic resin, metal or the like. Of these materials, stainless steel (SUS) is preferable for the tape guide.

To manufacture the substrate with the specific back surface, any method may be used as long as it satisfies the above-mentioned conditions. The following methods (1) and (2) may be specifically employed.

(1) Filler particles are mixed into a monomer of the resin for forming the substrate. The resin used to form the substrate is produced by polymerizing of monomer while filler particles are mixed and diffused into the resin.

(2) Resin forming the substrate is rendered molten, filler particles are mixed into the molten resin, and the product is cooled.

In the substrate manufacturing method (2) above, to mix the filler particles into thermoplastics, it is preferable to knead the thermoplastics material using a biaxial extruding machine of the vent type, and with an ethylene glycol slurry containing filler particles. This kneading method is very effective for preventing breakdown by stretching, and obtaining a specified content of particles and a desired number of surface region particles.

A preferable method for adjusting the content of particles is to prepare a high density master, and then dilute the master with a thermoplastic containing substantially no filler particles in the manufacturing stage.

Pellets of thermoplastics are dried if necessary, and supplied to a known molten-layer extruding machine. From a slit-like die, the material is extruded in the form of a sheet, and is solidified by cooling on a casting roll, thereby forming a film which has not yet been stretched. In this case, a static mixer and a gear pump are preferably installed in the polymer flow path for the thermoplastics material. This method is very effective for preventing breakdown due to stretching, and obtaining a specified content of particles, and a desired number of surface region particles.

The previously unstretched film is then biaxially stretched and oriented. The stretching method may be either a sequential biaxial stretching method or a concurrent biaxial stretching method. The sequential biaxial stretching method in which the film is longitudinally stretched and then laterally stretched is preferably used. In this case, the longitudinal stretching is carried out in three steps. The vertical-to-horizontal ratio is preferably 3.0 to 6.5.

The longitudinal stretching temperature cannot be determined absolutely since it depends on the kind of thermoplastics used, but usually is 50° to 130° C. in the first step, and higher than this range in the subsequent steps. The degree of progress of the longitudinal stretching is preferably within 5,000 to 50,000%/min. A tenter frame is usually used for the lateral stretching of the film. The percent of stretch is 3.0 to 5.0. The stretching speed is 1,000 to 2,000%/min. The temperature is preferably 80° C. to 160° C. The stretched film is subsequently subjected to a thermal treatment. The temperature for the thermal treatment is 170° C. to 200° C., preferably 170° C. to 190° C. The time is 0.5 to 60 seconds, preferably 0.5 to 30 seconds.

It is suggested to use the lower side of the stretched film for the back surface of the substrate. In taking up the manufactured substrate, the inner side of the coiled substrate is used for the back surface.

As for the substrate manufactured by the above-mentioned manufacturing method, the surface property of the surface of the substrate on which a magnetic layer is to be formed may be the same as or different from that of the back surface. The manufacturing method may be selected from among conventional methods, or the above-mentioned method may be altered so that the surface property of the magnetic-layer side of the substrate is set within a preset range.

The substrate may consist of two or more layers. The multilayer construction is preferred from the standpoint of controlling surface properties.

The thermoplastic resin used to form the substrate in accordance with the present invention may be polyester, polyolefin, polyamide, polyphenylene sulfide, or the like. Excellent production adaptability is achieved when the substrate contains, as a main component, the structural unit of at least one material selected from among ethylene terephthalate, ethylene $\alpha$, $\beta$-bis(2-chlorophenoxy), ethan-4, 4'-dicarboxylate, and ethylene 2, 6-naphthalate units.

Use of crystallizable thermoplastics for the substrate provides excellent production adaptability. The term "crystallizable" means that the substance is not amorphous, and quantitatively such a substance that the cold crystallization temperature $T_{cc}$ in the crystallization parameter is detected, and the crystallization parameter $\Delta T_{cg}$ is 150° C. or lower, preferably 150° to 50° C. Further, a substance which exhibits a crystallization heat of fusion (fusion enthalpy change) of 7.5 cal/g or higher, preferably 10 to 30 cal/g, measured by a differential calorimeter, provides good production adaptability. Ethyleneterephthalate is especially preferable.

Mixing a quantity of other types of thermoplastics is allowed, so long as the effects of the invention are not impaired. A copolymer may be used. Organic additives, such as an anti-oxidant, thermal stabilizer, lubricant, ultraviolet absorber, and the like, may be added to the thermoplastics. The quantity of organic additive should not be such as to impair the effects of the invention.

The substrate of the invention, before being coated with coating liquid, may be subjected to corona discharge, plasma processing, easy bonding, heat treatment, dust proofing, and the like.

The external force at which a degree of extensibility of the substrate is 5% is preferably 5 to 50 kg/mm² in the tape running direction, and preferably 3 to 30 kg/mm² in the lateral direction. The heat shrinkage factor of the substrate is preferably 3% or less, more preferably 1.5% or less, in both the longitudinal and lateral directions, under the condition that temperature is 100° C. and time is 30 minutes. Under the condition that temperature is 80° C. and time is 30 minutes, it is 1% or less, more preferably 0.5% or less. The breaking strength of the substrate should be 5 to 100 kg/mm² in both directions. The elastic modulus of the substrate should be 100 to 2000 kg/mm². The total thickness of the substrate used in the invention is 5 to 20 μm, more preferably 6 to 16 μm.

To evaluate the surface roughness of the outer surface 30 of the thus-manufactured tape guide 1 with respect to the charging thereof, the maximum height $H_m$ of the upward protrusions from the reference surface for the mean square roughness value $R_{rms}$ is controlled to be no greater than 60 nm (preferably 50 nm). The charge potential may be measured by a measuring system as shown in FIG. 3.

Figure 3:
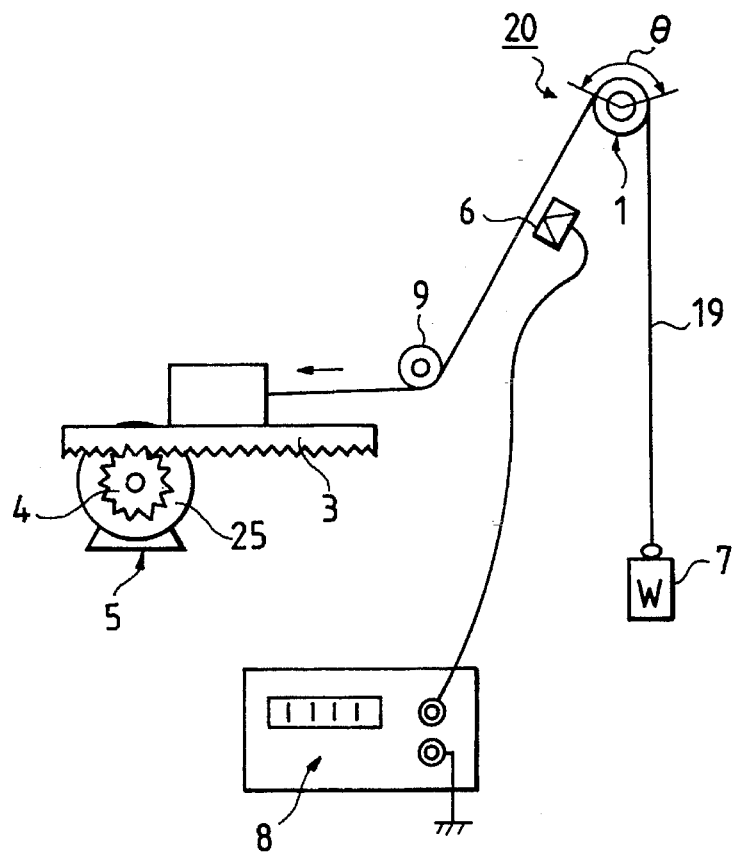
FIG. 3 is a diagram showing a measuring system for measuring the charge potential on a magnetic tape when it is slidably mounted on the tape guide shown in FIG. 2.

In a measuring system 20 shown in FIG. 3, the tape guide 1 is secured at a preset position. A guide roller 9 is fixed parallel with the tape guide 1. A magnetic tape 19 of a given length is put on the tape guide 1 and the guide roller 9. One end of the magnetic tape 19 is coupled to a drive system 5, while the other end thereof is connected to a load 7 for varying the tape tension T.

A sensor 6 for sensing the charge potential is provided between the tape guide 1 and the guide roller 9. The potential sensed by the sensor 6 may be measured by a potential measuring instrument 8.

In one example, the potential measuring instrument was a Trek Model 344-3ESVM, manufactured by Trek Inc., U.S.A. The drive system 5 is of the rack-and-pinion type including a rack 3 and a pinion 4 coupled with a motor 25, as shown. Alternatively, it may be of the take-up type.

The conditions for the measurement are as follows: temperature=room temperature, humidity=several tens %RH, load=several tens g, lap angle of the tape and guide=one hundred and several tens degrees, tape run speed=ten to several tens mm/sec, tape run length=one hundred to several hundreds mm, distance between the charge potential sensor and the tape=one to several mm, material of the guide roller= stainless steel SUS, and surface roughness (three-dimensional needle-contact surface roughness instrument)=100 nm.

The variation of the maximum protrusion height $H_m$ on the outer surface 30 of the tape guide 1 in the vicinity of 60 nm was examined. In the case of the tape guide 1 of which the maximum protrusion height $H_m$ is lower than 60 nm, the minimum charge potential is lower than −100 V, as the reference for the trouble-causing level. This result is satisfactory. However, when the maximum protrusion height $H_m$ is higher than 60 nm, the charge potential becomes very high, exceeding −100 V.

By comparing results of measuring the charge potential with the measuring system with the results obtained by calculating the upward protrusions on the guide surface of the tape guide 1 with an AFM instrument, the correlation between them was confirmed.

Figure 5:
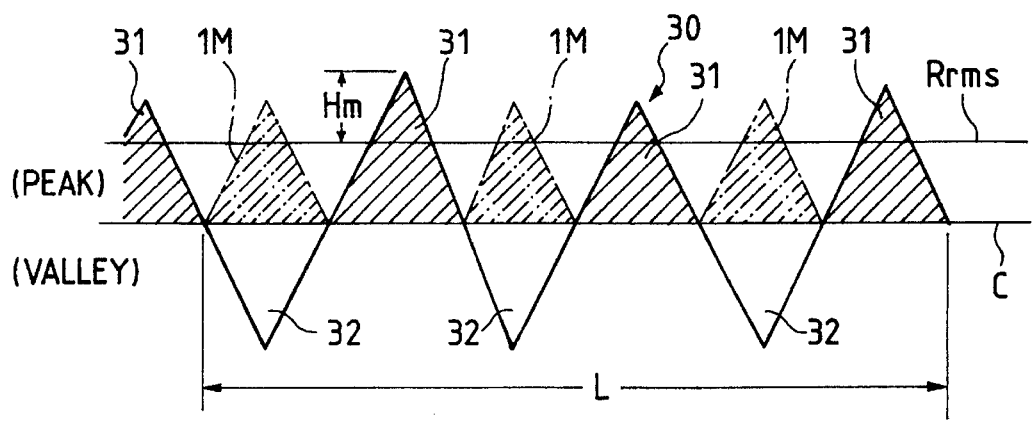
FIG. 5 is a diagram showing a model of the outer surface of the tape guide, useful in explaining the root mean square roughness.
Figure 6:
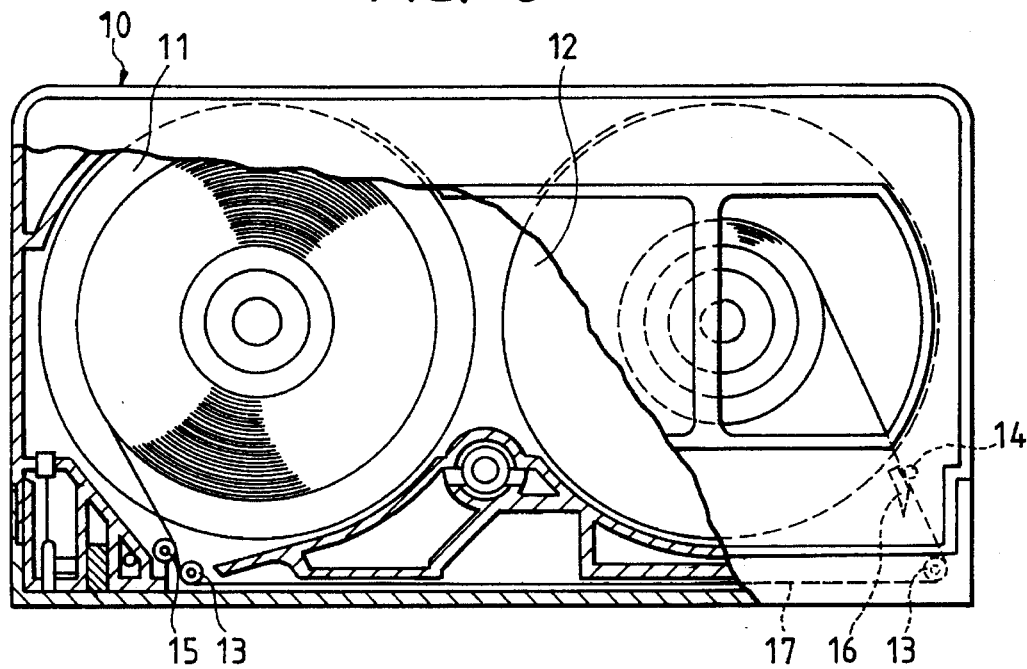
FIG. 6 is a plan view, partially broken away to illustrate the internal structure, showing a conventional magnetic tape cassette of the VHS type.

The reference surface for determining the root mean square roughness $R_{rms}$ is expressed by the equation (1). The profile of the outer surface 30 of the tape guide 1, as shown in FIG. 4, may be described by a general function f(x). A model of the FIG. 4 profile is shown in FIG. 5. The downward protrusions below the center line do not damage the substrate, and hence are substantially unnecessary components. Accordingly, those components of the downward protrusions, when squared, are directed upward as indicated by phantom lines. Those components directed upward are denoted as 1M. The surface with the imaginary surface roughness including the inverted protrusions 1M indicated by phantom lines has a new reference surface for the surface roughness $R_{rms}$ as shown.

$$R_{rms} = (1/L) \cdot \int f(x)^2 dx \qquad (1)$$

where L is the measuring length. The reference surface for the surface roughness $R_{rms}$ can easily be obtained using equation (1).

Figure 2:
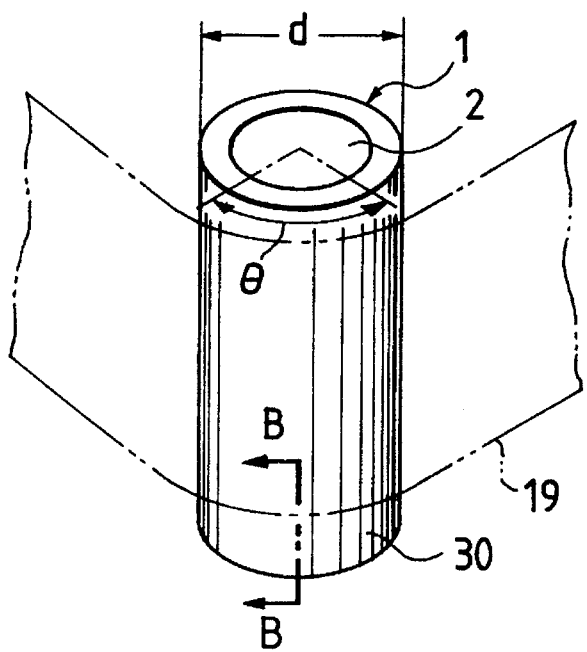
FIG. 2 is a perspective view showing a tape guide used in the magnetic tape cassette of FIG. 1.

The reference surface for the root mean square surface roughness value $R_{rms}$, when visually observed, is indicated by an imaginary line located above the center line in the profile of the cross section of the outer surface 30 of the tape guide 1 (surface profile of the cross section taken on line B—B in FIG. 2 ).

Thus, in the present invention, the reference surface used to define the height of the protrusion is determined independently of the actual protrusions. Therefore, the downward protrusions (portions 32) not contributing to the slide property of the tape guide with the magnetic tape need not be considered. In other words, only the upward protrusions 31 contributing to the tape slide property with the outer surface 30 of the tape guide 1 need be taken into consideration, and the charging phenomenon in connection with those protrusions handled.

It is evident that the present invention is applicable not only to magnetic tape cassettes of the VHS type, but also any other type of magnetic tape cassette provided with the tape guide.

There is no special restriction in selecting the material of the ferromagnetic powder used for the magnetic layer of the magnetic tape 19. Typical examples are enumerated below: $\gamma$-$Fe_2O_3$, Co-$\gamma$-$Fe_2O_3$, $FeO_x$ (1.33<x<1.5), $FeO_x$(1.33<x <1.5) containing Co, $Fe_3O_4$, $Fe_3O_4$ containing Co, $CrO_3$, ferromagnetic powder alloy containing Fe or Co as a main component (75% or more), and known ferromagnetic powders, such as barium ferrite. Among these materials, $Fe_3O_4$ containing Co and $FeO_x$ (1.33 <x<1.5) containing Co are more preferable.

The binder can be a known thermoplastics material, thermohardening resin, radiation hardening resin, reactive resin, or a mixture of these. Examples of the resin component are: polyvinyl copolymer (polyvinyl chloride-acetate vinyl copolymer, vinyl chloride-acetate vinyl-vinyl alcohol copolymer, vinyl chloride-acetate vinyl-acrylic copolymer, vinyl chloride-acrylonitrile copolymer, and the like), ethylene-vinyl copolymer, vinyl chloride copolymer to which a polar-group, such as $SO_3Na$ or $SO_2Na$, and an epoxy group is introduced, cellulosics, e.g., nitrocellulose resin, acrylic resin, polyvinyl acetate resin, polyvinyl butyryl resin, epoxy resin, phenoxy resin, polyurethane resin (e.g., polyester polyurethane resin, polyurethane resin into which a polar group, such as $SO_3Na$ or $SO_2Na$ is introduced, polycarbonate polyurethane resin).

A hardening agent is usually a polyisocyanate compound. The polyisocyanate compound is selected from among those used as a hardening component, such as polyurethane resin.

Where a hardening process by electron radiation is used, a compound (urethane acrylate) of reactive double bond can be used.

A binder of 5 to 50 wt %, more preferably 10 to 35 wt %, is used for the ferromagnetic powder. Where vinyl chloride resin is used for the binder, an amount of 5 to 30 wt % is used. Where polyurethane resin is employed, an amount of 3 to 30 wt % is used. Where polyisocyanate is used, the amount should be 0 to 20 wt %.

Carbon black for the magnetic layer is rubber furnace, rubber thermal, color black, acetylene black, or the like. The specific surface area is 5 to 500 mm$^2$/g. The DBP absorption oil quantity is 10 to 400 ml/100 g. The particle diameter is 5 to 300 nm. The pH is 2 to 10. The moisture content percentage is 0.1 to 10%. The tap density is 0.1 to 1 g/cc. Specific-examples of carbon black are: BLACKPEARLS 2000, 1300, 1000, 900, 800, and 700, and VALCAN XC-72, manufactured by Cabot Inc., #80, #60, #55, #50, and #35, manufactured by Asahi Carbon Ltd., #2400B, #2300, #900, #650, #40, #30, and #10B, manufactured by Mitusbishi Kasei Kogyo, Ltd.

The method of manufacturing the magnetic tape used for the magnetic tape cassette of the invention will be described.

All of the materials, i.e., binder, carbon black, abrasive, antistatic agent, lubricant, solvent, and the like, may be added in the initial stage at mid-course of any process. Each material may be dividedly added in two or more portions. Polyurethane may be dividedly put thereinto in a kneading process, a dispersion process, and a kneading process for viscosity adjustment after the dispersion process.

To obtain a desired slide property, a known manufacturing method is used as a part of the process to manufacture the substrate, and in the kneading process, a machine producing a strong kneading force, such as a continuous kneader or a pressure kneader, is used. In this way, a magnetic tape suitable for high density record/reproduction can be manufactured. When a continuous kneader or a pressure kneader is used, ferromagnetic powder and a part or all of the binder (preferably 30 wt % or more of the total amount of the binder) are kneaded using a solvent. In this case, 15 to 500 parts by weight of solvent are used for 100 parts by weight of ferromagnetic powder. Appropriate kneading processes are described in Published Unexamined Japanese Patent Applications Nos. Hei. 1-106338 and Sho. 64-79274.

A coating process may be carried out using a known technique (e.g., gravure coating, roll coating, blade coating, extrusion coating, and the like). If required, a multilayered magnetic layer may be formed using a simultaneous multilayer coating method as disclosed in Published Unexamined Japanese Patent Application No. Sho. 62-212993. Also, reference can be made to "Up-to-Date Coating Techniques," May 31, 1983, published by K. K. Sogo Gijutsu Center.

To obtain the magnetic tape of the magnetic tape cassette of the invention, intensive orientation is performed. Use of a solenoid of at least 1000 G (Gauss) and a cobalt magnet of 2000 G or more is preferable. Additionally, an appropriate drying process is preferably carried out before the orientation in order to obtain the highest orientation after the tape is dried.

A calender process roll is also used, which is preferably a heat-resistant plastic roll made of epoxy, polyimide, polyamide, polyimide amide or the like. Paired metal rolls may also be used alternatively. The process temperature is preferably 80° C. or higher. The linear pressure is preferably 200 kg/cm, more preferably 300 kg/cm or more. The velocity is 20 m/min to 700 m/min.

As described above, in the magnetic tape cassette of the invention, the surface roughness of the outer surface of the tape guide located in the forward part of the cassette is determined by the height of the protrusions from the reference surface determined for the root mean square roughness $R_{rms}$. This height is controlled to be below a preset height. Accordingly, the downward components not contributing to the slide property of the outer surface of the tape guide with the magnetic tape can be removed. Those components actually contributing to the tape slide property of the outer surface of the tape guide are retained. The back surface of the substrate of the magnetic tape can be processed to have a specific surface property. Charging of the magnetic tape can be prevented considerably reliably, without complexity of the cassette structure, or performing special processing of the magnetic tape, such as back layer formation. Accordingly, the tape runs stably. The stable running of the tape eliminates jitter and tape jamming.

The effects of the magnetic tape cassette of the invention thus far described will be further clearly understood with reference to Example 1 and Comparison Example 1.

EXAMPLE 1

The surfaces of substrates each 15 μm thick and made of polyethylene terephthalate (PET) and polyethylene naphthalate (PEN) were coated with a magnetic diffusion liquid composed of the following compositions, thereby forming a film of 3 μm (dried film):

| Magnetic Coating Liquid Composition | |
| --- | --- |
| Fe/Zn/Ni powder (92:4:4 in weight ratio) (needle particles of 0.20 μm in average particle diameter in the longitudinal direction, coercive force: 1600 oersted) | 300 parts by weight |
| Polyvinyl chloride - acetate vinyl copolymer | 30 parts by weight |
| Conductive carbon | 20 parts by weight |
| Polyamide resin | 15 parts by weight |
| Polyamide resin (amine valence 300) | 15 parts by weight |
| Lecitine | 6 parts by weight |
| Silicon oil (dimethyl polysiloxane) | 3 parts by weight |
| Cyclohexanone | 300 parts by weight |
| Ethyl methyl ketone | 300 parts by weight |
| n-butanol | 100 parts by weight |

Magnetic tapes each cut to have the width of 12.7 mm were respectively brought into contact with the outer surface of the tape guides each of 6 mm in outer size, made of stainless steel (SUS420J) and aluminum (AC5A). The magnetic tapes were moved five times at the same position under the following conditions, and the charge potential of the tapes was measured:

| | |
| --- | --- |
| Tape running speed | 0.03 m/sec |
| Tape tension | 4 g/mm |
| Temperature, humidity | 23° C., 70% RH |
| Potential measurement | TREKMODEL 344-3ESVM, manufactured by Trek Inc., U.S.A. |

The outer surface of the tape guide was finished to have a surface roughness such that the maximum height $H_m$ from the reference surface for the surface roughness $R_{rms}$ was 40 to 60 nm. The height was measured with an AFM instrument, manufactured by Digital Instrument Inc., U.S.A.

The surface specific resistance $R_s$ of polyethylene terephthalate (PET) and polyethylene naphthalate (PEN) was $10^8$ Ω. The charge potentials of the magnetic tape samples were as shown in Table 1.

Comparison Example 1

The running charge potential of the magnetic tape samples was measured under the same conditions as in Example 1, except that the maximum height $H_m$ of each tape guide was set to 85 nm.

The results of the measurement were as shown in Table 1. In the column "Evaluation" in the table, 0 indicates that the charge potential is the lowest, and the tape running is good, Δ indicates that the charge potential is approximately −100 V and the tape running is somewhat unsatisfactory but within a tolerable range, and X indicates the charge potential greatly drops and the tape running is poor.

by the extruder.

The unextended film was longitudinally stretched by a factor or 4.5 at 80° C. The primary stretched film was laterally stretched by a factor of 4.0 at 100° C. at a speed of 2,000%/min using a tenter frame. The resultant film at a fixed length was subjected to a heat treatment at 190° C. for five seconds. As a result, a biaxially oriented film of 14.0 μm

TABLE 1

|  | Sample No. | Material of substrate | Material of tape guide | Surface roughness $R_{rms}$- Hm (nm) | Charged potential of guide (−V) | Evaluation |
|---|---|---|---|---|---|---|
| Example 1 | 1 | PET | SUS420J | 40 | 50 | o |
|  | 2 | " | " | 50 | 70 | o–Δ |
|  | 3 | " | " | 62 | 112 | x |
|  | 4 | " | " | 80 | 160 | x |
|  | 5 | PEN | " | 40 | 48 | o |
|  | 6 | " | " | 50 | 66 | o |
|  | 7 | " | " | 62 | 120 | x |
|  | 8 | " | " | 80 | 156 | x |
|  | 9 | PET | AC5A | 40 | 45 | o |
|  | 10 | " | " | 50 | 65 | o–Δ |
|  | 11 | " | " | 62 | 105 | Δ |
|  | 12 | " | " | 80 | 148 | x |
|  | 13 | PEN | " | 40 | 44 | o |
|  | 14 | " | " | 50 | 68 | o |
|  | 15 | " | " | 62 | 102 | o–Δ |
|  | 16 | " | " | 80 | 145 | x |
| Comparative Example 1 | 17 | PET | SUS420J | 85 | 160 | x |
|  | 18 | PEN | " | " | 165 | x |
|  | 19 | PET | AC5A | " | 158 | x |
|  | 20 | PEN | " | " | 162 | x |

As seen from Table 1, the charge potential values of the conventional samples (nos. 17 to 20) in Comparison Example 1 are much higher than the upper level, approximately −100 V within which the adverse effects on the tape running are tolerable.

In Example 1, samples nos. 3, 4, 7, 8, 12, and 16 are not preferable. However, it was confirmed that where the height $H_m$ is 60 nm or lower, excellent effects were obtained even if aluminum or stainless steel is used for the tape guide.

In Examples 2 to 7 and Comparison Examples 2 to 6, the effects obtained when the surface property of the substrate is changed were confirmed.

EXAMPLES 2 AND 7

Ethylene glycol slurry containing crosslinked polystyrene particles of an average particle diameter of 100 nm, silica particles originating from colloidal silica an average particle diameter of which is 100 nm, and aluminum oxide of an average particle diameter of 100 nm at a weight ratio 5:65:25 was prepared. The ethylene glycol slurry was subjected to a heat treatment at 190° C. for 1.5 hours. Following this, the slurry was made to ester exchange react with terephthalate dimethyl, and the result condensation polymerized. In this way, pellets of polyethylene terephthalate (PET) containing 0.5 to 20 wt % of the thus-formed particles were produced. At this time, condensation polymerizing time was adjusted so as to thereby set the intrinsic viscosity to 0.70. Thereafter, this polymer was dried under a reduced pressure (3 torr) at 180° C. for six hours, and supplied to an extruder and cut at 290° C. The resultant polymer was wound around a casting drum at 30° C. in surface temperature using an electrostatic applied cast, and solidified by cooling, thereby forming a layered film not yet extended. The thickness of the film was adjusted by controlling the quantity of the polymer extruded in total thickness was formed. A magnetic layer coating liquid was prepared as below.

| | |
|---|---|
| Co-γ-FeO$_x$ | 100 parts by weight |
| (x: Fe$^{2+}$/Fe$^{3+}$, molar ratio: 30/100) | |
| (coercive force: 800 Oe, δ$_s$ = 80 | |
| emu/g, specific surface area = 35 | |
| m$^2$/g, average major axis length = 0.15 | |
| μm) | |
| Polyvinyl chloride polymer | 10 parts by weight |
| (Sulfonic group content: 1 × 10$^{-4}$ | |
| eq/g, degree of polymerization: 300) | |
| Polyester polyurethane resin | 5 parts by weight |
| (Neopentyl glycol/caprolactam | |
| polyol/MDI = 0.9/2.6/1, | |
| Sulfonic group content: 1 × 10$^{-4}$ eq/g) | |
| Stearin | 8 parts by weight |
| Butyl stearate | 1 part by weight |
| α - alumina | 5 parts by weight |
| (average particle diameter: 0.1 μm) | |
| Carbon black | 5 parts by weight |
| (average particle diameter: 70 μm) | |
| Solvent | 100 parts by weight |
| (butyl acetate/ethyl ketone = 7/3 in | |
| weight ratio) | |

The above compositions were kneaded and dispersed by a kneader, and polyisocyanate hardening agent was added to the resultant, thereby forming a coating liquid.

A PET substrate 14 μm thick was coated with the thus-formed coating liquid, thereby forming a film 3.5 μm thick after drying. Subsequently, the resultant was oriented in a magnetic field and dried, and processed by a supercalender, and slit to a width of one-half inch. In this way, a test piece was formed.

EXAMPLE 3

In manufacturing the substrate in Example 3, the average particle diameter of colloidal silica was changed to 200 nm, and the quantity of filler was changed to 15 wt %. Under these conditions, a magnetic tape was manufactured as in Example 2.

EXAMPLE 4

In manufacturing the substrate in Example 4, the average particle-diameter of colloidal silica was changed to 300 nm, and the quantity of filler was changed to 10 wt %. Under these conditions, a magnetic tape was manufactured as in Example 2.

EXAMPLE 5

In manufacturing the substrate in Example 5, the average particle diameter of colloidal silica was changed to 500 nm, and the quantity of filler was changed to 8 wt %. Under these conditions, a magnetic tape was manufactured as in Example 2.

EXAMPLE 6

In manufacturing the substrate in Example 6, the average particle diameter of colloidal silica was changed to 900 nm, and the quantity of filler was changed to 3 wt %. Under these conditions, a magnetic tape was manufactured as in Example 2.

Comparison Example 2

In manufacturing the substrate in Comparison Example 2, the average particle diameter of colloidal silica was changed to 10 nm, and the quantity of filler was changed to 20 wt %. Under these conditions, a magnetic tape was manufactured as in Example 2.

Comparison Example 3

In manufacturing the substrate in Comparison Example 3, the average particle diameter of colloidal silica was changed to 10 nm, and the quantity of filler was changed to 50 wt %. Under these conditions, a magnetic tape was manufactured as in Example 2.

Comparison Example 4

In manufacturing the substrate in Comparison Example 4, the average particle diameter of colloidal silica was changed to 60 nm, and the quantity of filler was changed to 30 wt %. Under these conditions, a magnetic tape was manufactured as in Example 2.

Comparison Example 5

In manufacturing the substrate in Comparison Example 5, the average particle diameter of colloidal silica was changed to 1000 nm, and the quantity of filler was changed to 30 wt %. Under these conditions, a magnetic tape was manufactured as in Example 2.

Comparison Example 6

In manufacturing the substrate in Comparison Example 6, the average particle diameter of colloidal silica was changed to 1500 nm, and the quantity of filler was changed to 40 wt %. Under these conditions, a magnetic tape was manufactured as in Example 2.

The magnetic tape thus manufactured was set on a tape guide of which the outer surface had a preset protrusion height (height of the highest protrusion) from the root mean square roughness of the outer surface. The performances were evaluated as shown in Table 1. The tape guide used was a metal guide made of SUS stainless steel.

The charge potential was measured using the measuring system of FIG. 3.

The conditions for the measurement were as follows: temperature=23° C., humidity=40% RH, load=50 g, lap angle of the tape and guide=162°, tape running speed=20 mm/sec, tape run length=160 mm, and distance between the charge potential sensor and the tape=2 mm.

The potential measuring instrument was a Trek Model 344-3ESVM, manufactured by Trek Inc., U.S.A.

For measurement of the tape running performance, a T-120 tape was loaded in a VTR. After the tape had ran one length in an FF/REW (fast forward/rewind) mode, the sticking of the tape to the guide was observed. An evaluation that the tape sticks to the guide and sag is created was denoted as "X", and an evaluation of no problem was denoted as 0.

To detect an increase of dropout (DO), the initial dropout rate DO of the T-120 VHS tape was measured in the following way. Dropout such that the reproduction output level drops 16 dB or more during a period of 1/10 H or longer was measured by a dropout counter. Thereafter, the tape ran 100 paths in the FF/REW mode, and the dropout rate DO was measured in the same manner as the initial DO. An increase of the DO from the initial DO was measured.

For the electromagnetic characteristic, the reproduction output level was an output level at 4.2 MHz measured using a VTR AG3700, manufactured by Matsushita Ltd. The output reproduction level was measured relative to 0 dB of the output level of a VHS video tape "DC-HG-T-120", manufactured by Fuji Photo Film Co., Ltd. The surface roughness $R_{rms}$ of the tape guide was measured with an AFM instrument.

TABLE 2

| Sample | Number of protrusions on PET base (number of protrusions higher than 300 nm/0.1 mm$^2$) | Charged potential on Base (−V) | Tape running performance (FF/REW) | Increase of DO (number/min) | electromagnetic characteristic (RF output level:dB) | Surface roughness $R_{rms}$ of tape guide (hight of highest protrusion nm) |
|---|---|---|---|---|---|---|
| Example 2 | 30 | 40 | o | 50 | 3 | 10 |
| Example 3 | 50 | 20 | o | 20 | 2 | 30 |
| Example 4 | 100 | 10 | o | 20 | 1.5 | 50 |
| Example 5 | 200 | 10 | o | 20 | 1.5 | 50 |
| Example 6 | 400 | 2 | o | 20 | 1.5 | 50 |
| Example 7 | 30 | 5 | o | 10 | 3 | 50 |
| Comparative Example 2 | 5 | 150 | x | 300 | 3 | 70 |

TABLE 2-continued

| Sample | Number of protrusions on PET base (number of protrusions higher than 300 nm/0.1 mm$^2$) | Charged potential on Base (-V) | Tape running performance (FF/REW) | Increase of DO (number/min) | electromagnetic characteristic (RF output level:dB) | Surface roughness R$_{rms}$ of tape guide (hight of highest protrusion nm) |
|---|---|---|---|---|---|---|
| Comparative Example 3 | 15 | 100 | x | 220 | 2.5 | 80 |
| Comparative Example 4 | 20 | 60 | x | 90 | 2 | 100 |
| Comparative Example 5 | 600 | 50 | x | 120 | -1.5 | 70 |
| Comparative Example 6 | 800 | 100 | x | 180 | -2.5 | 100 |

As seen from Table 2, the test piece of the magnetic tape had a low charge potential, excellent tape running performance, and high reproduction output, and suffers from no increase of the dropout rate DO.

In Comparison Examples 2 to 6, the charge potential is high. Accordingly, the dropout rate DO is increased and the tape running is poor.

What is claimed is:

1. In a magnetic tape cassette having a metal tape guide for guiding a magnetic tape, the magnetic tape comprising a substrate and a magnetic layer provided on a front surface of the substrate, the guide being in direct contact with a back surface of the substrate, and in which the substrate is made of a material comprising one of polyethylene terephthalate and polyethylene naphthalate, the improvement wherein a surface specific resistance R$_s$ of the back surface of the substrate is at least approximately $10^8$ Ω/cm$^2$, the tape guide is made of a material comprising one of stainless steel and aluminum, and a surface roughness of the tape guide is such that a height of a highest one of a plurality of protrusions on the surface of the tape guide measured from a reference surface for determining a root mean square roughness value R$_{rms}$ is no greater than approximately 60 nm.

2. The magnetic tape cassette of claim 1, wherein said guide is made from a material comprising one of SUS420J and SUS316 stainless steel and AC5A aluminum according to the JIS (Japanese Industrial Standards).

3. The magnetic tape cassette of claim 1, wherein said height of said protrusions is no greater than approximately 50 nm.

4. The magnetic tape cassette of claim 1, wherein said substrate comprises filler particles having an average particle diameter in a range from 100 to 900 nm.

5. The magnetic tape cassette of claim 4, wherein said back surface of the substrate has 30 to 400 protrusions of a height of 300 to 600 nm per 0.1 mm$^2$.

6. The magnetic tape cassette of claim 4, wherein the substrate contains 1.5% to 40% by weight of the filler particles based on the total weight of the substrate.

7. The magnetic tape cassette of claim 1, wherein said substrate comprises filler particles having an average particle diameter in a range from 200 to 500 nm.

* * * * *